United States Patent [19]
Morimoto et al.

[11] Patent Number: 5,525,015
[45] Date of Patent: Jun. 11, 1996

[54] PNEUMATIC TRANSPORT SYSTEM FOR POWDERED MATERIALS

[75] Inventors: Kiyoshi Morimoto; Yoshika Sanada; Teiichi Miwa, all of Shizuoka; Kazue Murata, Nara, all of Japan

[73] Assignees: Kyowa Hakko Kogyo Co., Ltd., Tokyo; Kabushikikaisha Matsui Seisakusho, Osaka, both of Japan

[21] Appl. No.: 227,256

[22] Filed: Apr. 14, 1994

[30] Foreign Application Priority Data

Apr. 19, 1993 [JP] Japan .................................. 5-091205

[51] Int. Cl.⁶ ............................................ B65G 53/66
[52] U.S. Cl. ................................... 406/50; 406/125
[58] Field of Search .......................... 406/50, 125, 127, 406/128, 130, 186

[56] References Cited

U.S. PATENT DOCUMENTS

5,150,990 9/1992 Morimoto et al. ................. 406/50
5,211,514 5/1993 Morimoto et al. ................. 406/50

*Primary Examiner*—Jesús D. Sotelo
*Attorney, Agent, or Firm*—Jones, Tullar & Cooper

[57] ABSTRACT

A pneumatic transport system for powdered materials for quantifying and pneumatically transferring powdered materials. When materials are fed above an inclined guide plate in a material feeder with its bottom opening closed by a valve plug, a slide damper is slid to divide the materials in the feeder vertically. An open space is formed under the inclined guide plate so that the materials aren't damaged when the slide damper is moved. When the valve plug is retracted, the materials under the slide damper are fed into a transport plug housed in a plug setting portion. The transport plug is pneumatically transported into a material discharge port by compressed air supplied by an air supply. After the transportation is finished, the transport plug is returned into the plug setting portion.

12 Claims, 10 Drawing Sheets

PRIOR ART

FIG. 9

PRIOR ART

Page number: 5,525,015

PNEUMATIC TRANSPORT SYSTEM FOR POWDERED MATERIALS

FIELD OF THE INVENTION

The present invention relates to a pneumatic transport system for powdered or granular materials for transporting powdered or granular materials such as tablets or resin pellets to a desired place by utilizing a transport plug which is pneumatically transferred in a transport pipe.

PRIOR ART

It is often required for tablets to be transported accurately and quantitatively when tablets manufactured by a tablet molding machine are transported to the next treatment process. In order to cope with such a case, a pneumatic transport system is disclosed in JP-A-4-217513 and JP-A-4-217512 (U.S. Pat. No. 5,211,514, EP-A-0485988). According to the prior invention (FIGS. 8–10), a transport plug 4e is provided in a transport pipe 3e for transporting tablets and is pneumatically transported to a material discharge port 10e by air pressure supplied to the transport pipe 3e from a nozzle 9. A material feeder 63 is provided above a material supply port 5e of the transport pipe 3e and is provided with an inclined guide plate 60, a slide damper 61, a valve plus 6e and a material weighing chamber 62 having a sensor S such as a photoelectric sensor or a capacitance sensor.

Figure 8:
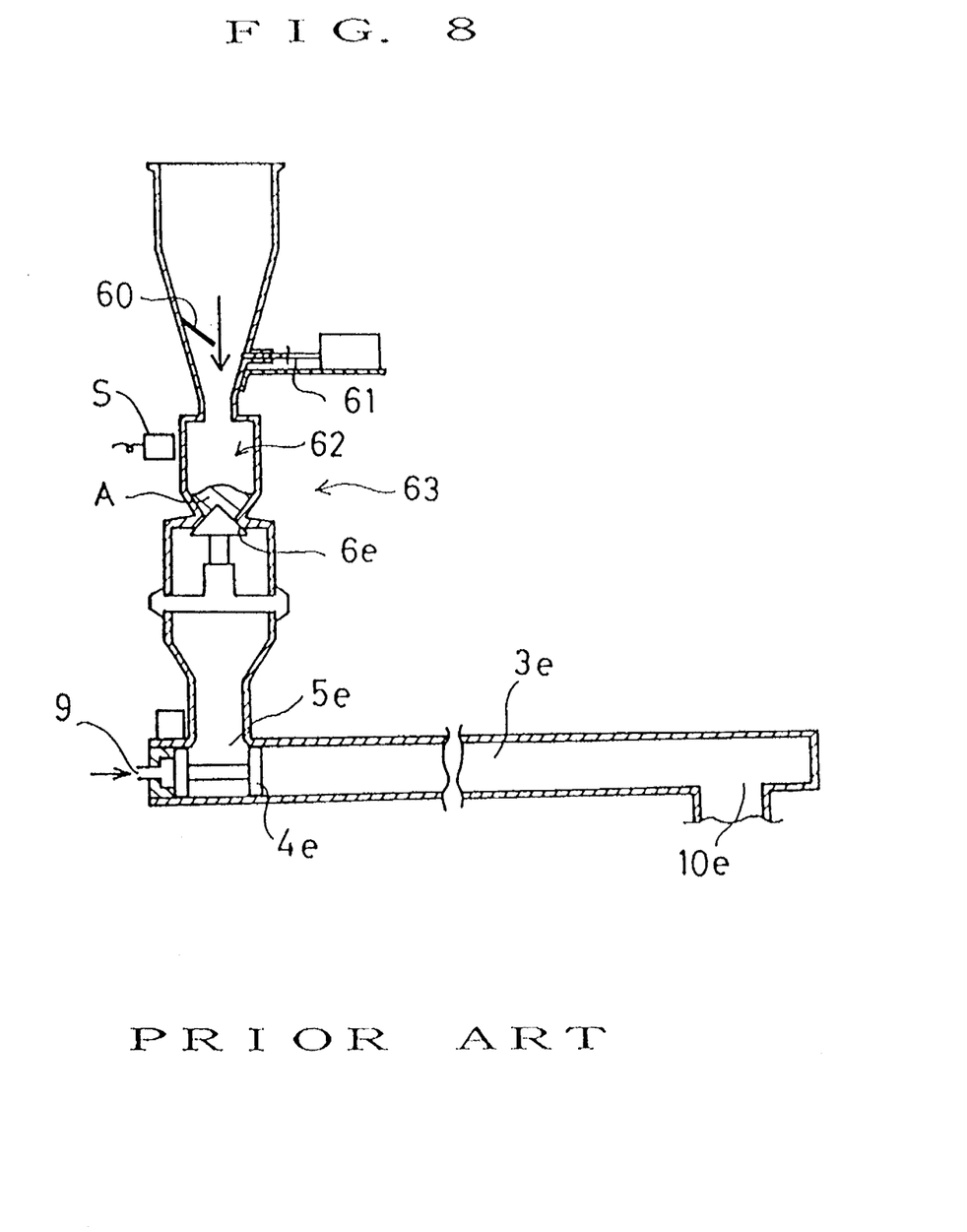
FIG. 8 is a sectional view showing one prior art embodiment of a pneumatic transport system for powdered or granular materials.

In such a construction, tablets A are sequentially filled in the material weighing chamber 62 when the valve plug 6e closes the bottom of the chamber 62. When the level of the tablets A stored in the chamber 62 reaches a fixed level detected by the sensor S, the slide damper 61 is moved. Tablets are prevented from falling into the material weighing chamber 62 by the slide damper 61 and the inclined guide plate 60. According to such means, the tablets A are quantified in the material chamber 62 and housed in the transport plug 4e by opening the valve plug 6e, enabling quantitative transportation of tablets.

Such a prior system has the following problems because the sensor S is used to weigh the tablets A.

Figure 10A:
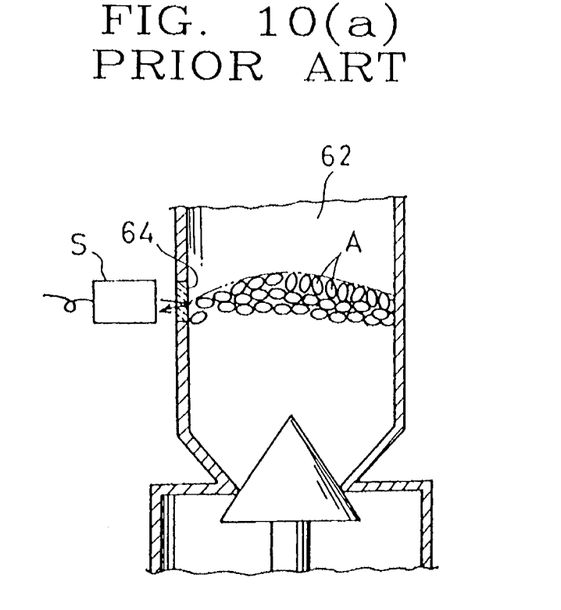
FIG. 10(a) and FIG. 10(b) are prior art partial sectional views of one embodiment of material weighing means.
Figure 10B:
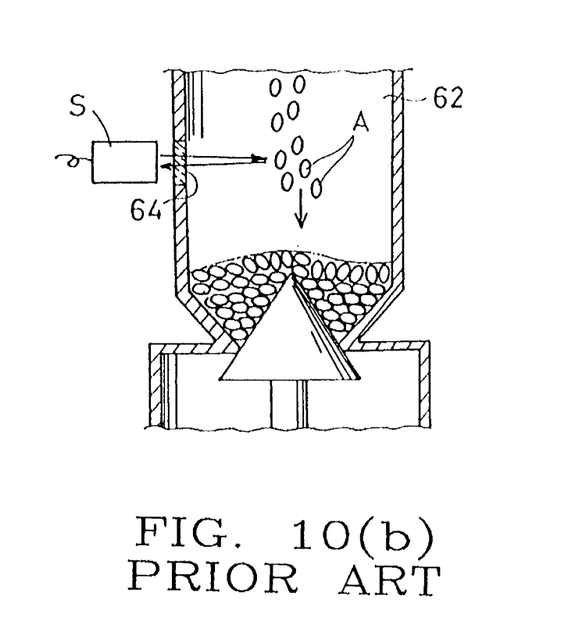

When a photoelectric sensor is used as the sensor S, the photoelectric sensor detects the tablets A stored in the material weighting chamber 62, as shown in FIG. 10(a), and also detects the tablets A falling into the chamber 62, as shown in FIG. 10(b). Such detections should be differentiated. Such distinction can be done according to the difference of the amount of reflecting light which the sensor receives from the tablets A. However, its light detection level should be properly adjusted in order to execute the distinction.

Such adjustment isn't easy and it is too difficult for a user to adjust the sensor by himself. Therefore, when the sensor detects the tablets A falling in the material weighing chamber 62, the sensor may make the mistake that a fixed amount of tablets A has been stored in the material weighing chamber 62 in spite of the fact that a fixed amount of tablets A isn't stored in the chamber 62. There is the possibility of such a faulty operation caused by inadequate adjustment.

Even if the light detection level of the sensor is properly adjusted by a manufacturer, the sensor is sometimes inappropriately operated because powder of the tablets A attaches on a light receiving surface or a transparent window 64 of the sensor after long-term service. As a result, the tablets A aren't always properly weighed nor quantitatively transported in the prior invention which employs such a sensor.

SUMMARY OF THE INVENTION

The present invention is proposed to solve the above-mentioned problems. The object of the present invention is to provide a pneumatic transport system for powdered or granular materials wherein accurate quantification of materials and appropriate quantitative transportation are accomplished by simple means without using the sensor described hereinbefore.

In the prior art, an inclined guide plate and a slide damper are provided in a material feeder and are used for stopping feeding of powdered or granular materials. However, according to the present invention, materials are filled over an inclined guide plate and a slide damper and weighed or quantified by being blocked by the slide damper. At the same time, materials aren't damaged when they are blocked by the slide damper because an escaping space is formed under the inclined guide plate by the slide damper. The present invention has such a unique advantage which isn't seen in the prior art.

According to the present invention, a pneumatic transport system for transferring powdered or granular materials by a transport plug from a plug setting portion to a discharge port in a transport pipe has an integrally formed material feeder connected to a material supply port of the transport pipe. The material feeder comprises a valve for opening and closing a bottom opening of the material feeder and the bottom opening is communicated with the material supply port of the transport pipe. The material feeder also includes an inclined guide plate for producing an escaping space thereunder in which no materials is filled when materials are charged into the material feeder under the condition that the bottom opening is closed by the valve. The material feeder is further provided with a slide damper disposed under the inclined guide plate for dividing powdered materials charged in the material feeder up and down so that some of the materials enter the escaping space when the materials are charged over the guide plate.

According to the present invention, the slide damper slides from the opposite side of the inclined guide plate into the escaping space formed under the inclined guide plate so that powdered or granular materials are divided vertically and some materials move into the escaping space.

According to the present invention, the material feeder is inclined at a specific angle so that the escaping space can be enlarged.

According to the present invention, the valve is reciprocatably provided in a communication passage of which one end is communicated with the material supply port of the transport pipe and an upper wall is communicated with the bottom opening of the material feeder. The bottom opening is closed when the valve moves forward to close the supply port of the transport pipe.

According to the present invention, the valve plug is reciprocatably provided in a communication passage of which the bottom end is connected with the material supply port of the transport pipe so as to be able to open and close the material supply port, an inner wall of the communication passage is opened so as to communicate with the bottom opening of the material feeder, and the bottom opening of the material feeder is closed by a peripheral side of the valve plug when the valve plug moves forward.

According to the present invention, air discharge means is provided at the tip of the valve plug and blows away the powdered or granular materials remaining in the communication passage into the plug setting portion through the material supply port by air pressure.

According to the present invention, the transport pipe is slanted in such a manner that a material discharge port is located higher than the material supply port and the pipe is provided with gas supply means for pneumatically transporting a transport plug set in the plug setting portion under the material supply port upward to the material discharge port. Disc-like bodies of the transport plug may be provided with plural through holes for passing air beneath the transport plug into the area above it when the transport plug falls under gravity in the transport pipe after the transport plug is pneumatically transported into the material discharge port.

According to the present pneumatic transport system for powdered or granular materials, materials are sequentially fed in the material feeder and filled over the inclined guide plate with the bottom opening of the feeder closed by the valve plug. In this case, the escaping space in which the materials aren't filled is formed under the inclined guide plate. The capacity of the escaping space depends on the diameter, shape and surface condition of a particle of the materials. However, powdered or granular materials have such characteristic that they are stably stored at an inherent angle of repose under the inclined guide plate. Therefore, the escaping space of the same capacity is always formed under the inclined guide plate if the materials consist of the same kind of powder or granule. The materials filled under the slide damper is quantified when the slide damper is operated to be moved in the material feeder below the inclined guide plate and divides the materials in the feeder vertically with some materials moved in the escaping space. As a result, the materials can be quantitatively transported when the bottom opening of the material feeder is opened so that the materials are stored in the transport plug housed under the slide damper. Therefore, a sensor for weighing the materials isn't required to quantify the materials.

If the materials are densely filled in the material feeder and can't flow therein at all when the slide damper is going to move, the slide damper can't usually separate the materials in the feeder because of the existence and resistance of the powdered or granular materials. However, in the present invention, the escaping space is formed in the material feeder and the materials can suitably flow in the feeder. Therefore, the materials in the material feeder can be prevented as much as possible from being the hindrance to the operation of the slide damper because the materials flow in accordance with the operation of the slide damper and some of them move into the escaping space when they are divided by the slide damper in the feeder. Accordingly, the slide damper can appropriately divide the materials in the material feeder.

According to an embodiment of the present invention, the slide damper slides from the opposite side of the inclined guide plate into the escaping space formed under the inclined guide plate. Then the slide damper divides the materials vertically with some materials pushed into the escaping space. As a result, the materials aren't pressed nor pinched by the slide damper. Even if the materials are fragile tablets, improper breakage isn't caused.

According to an embodiment of the present invention, the material feeder is provided so as to be inclined with a fixed angle and the capacity of the escaping space under the inclined guide plate can be enlarged. Therefore, the materials are more completely prevented from being damaged when the slide damper slides in the material feeder, because the materials can easily run in the feeder in accordance with the operation of the slide damper.

According to an embodiment of the present invention, one valve plug can open and close both the material supply port of the transport pipe and the bottom opening of the material feeder. Compressed gas in the transport pipe for pneumatic transportation doesn't leak into the bottom opening of the material feeder because the valve plug blocks up both of them airtightly. Moreover, no space is required for the valve plug in the material feeder because the valve plug isn't provided in the material feeder. Accordingly, the material feeder can be made smaller by reducing its height, if necessary.

Further according to an embodiment of the present invention, when the powdered or granular materials discharged from the bottom opening of the material feeder remain in the communication passage provided on the material supply port, such materials can be blown away into the plug setting portion of the transport pipe from the material supply port by air pressure supplied from air discharge means provided at the tip of the valve plug. Therefore, the materials remaining in the communication passage can be prevented from being pinched and damaged by the valve plug.

According to an embodiment of the present invention, feeding of transport gas is stopped after the transport plug is pneumatically transported into the material discharge port which is located higher than the material supply port. The transport plug falls under gravity and spontaneously returns to the plug setting portion where the transport plug is originally housed. Therefore, gas supply means for returning the transport plug isn't required, thereby simplifying the system. The air beneath the transport plug in the transport pipe passes the through holes of its bodies into the area above it when the transport plug falls under gravity. Because air resistance on the transport plug is reduced, its falling speed can be increased and the time which it takes to return to its original housing position can be shortened.

DETAILED DESCRIPTION OF THE PREFERRED EMBODIMENT

Now one embodiment of the present invention will be described with reference to the attached drawings.

Figure 1:
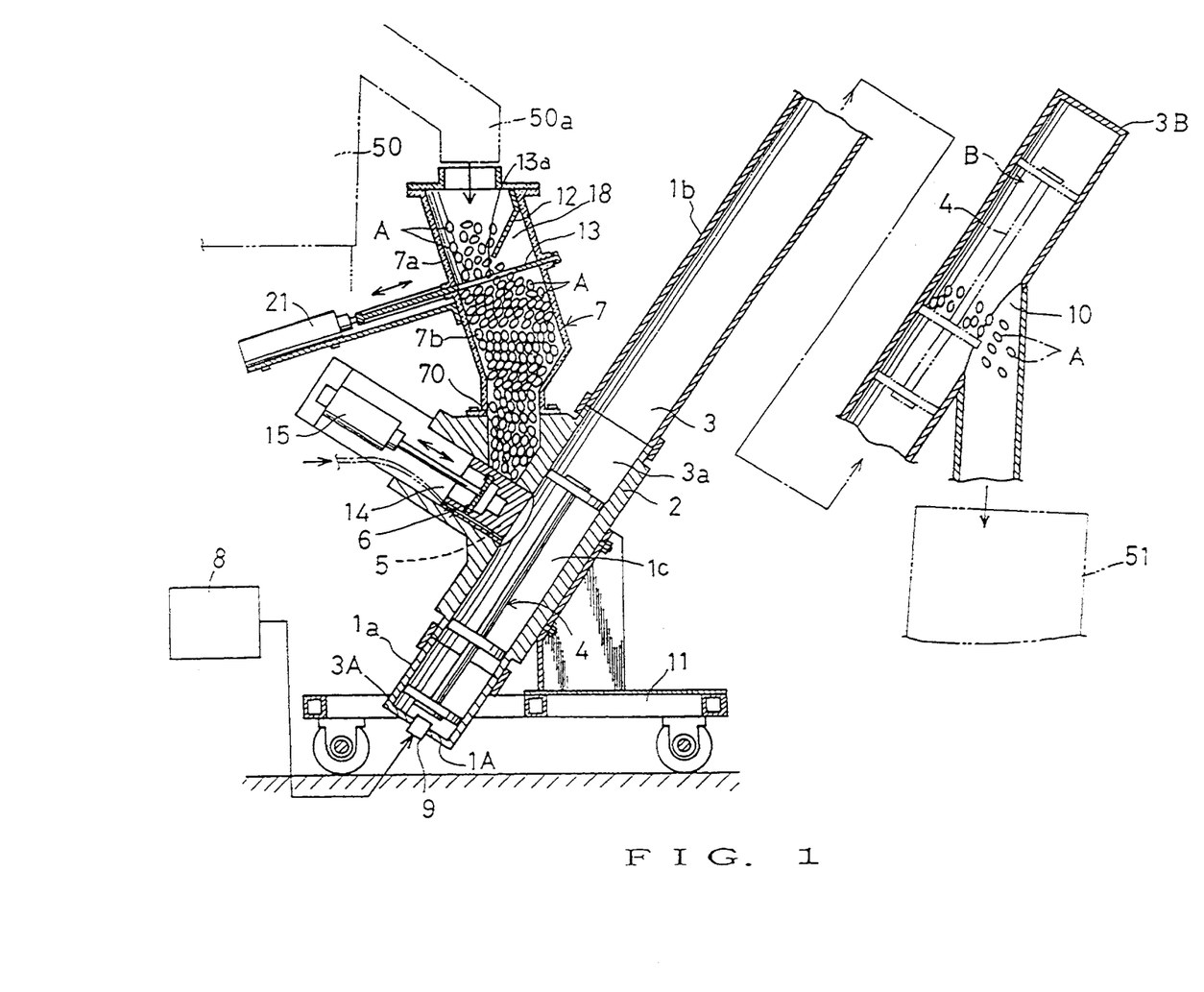
FIG. 1 is one embodiment of a pneumatic transport system for powdered or granular materials according to the present invention.

FIG. 1 is a sectional view showing the overall construction of a pneumatic transport system for powdered or granular materials according to the present invention. The pneumatic transport system pneumatically transports tablets A discharged from a pipe 50a of a tablet molding machine 50, which manufactures tablets, to a collector 51. The pneumatic transport system comprises a transport pipe 3 which is formed integrally with pipes 1a, 1b made of synthetic resin and so on and a penetrated passage 3a provided for a fitting 2, a transport plug 4 housed in a plug setting portion 1c of the transport pipe 3, a valve plug 6 for opening and closing a material supply port 5, a material feeder 7 provided above the material supply port 5, an inclined guide plate 12 provided in the material feeder 7, and a slide damper 13. The fitting 2 constituting one part of the transport pipe 3 is designed to be supported by a cart 11 so as to be easily carried.

The transport pipe 3 is formed integrally like a straight pipe and inclined such that a terminal end 3B is located higher than an initial end 3A. However, the present invention isn't restricted to this construction and the transport pipe 3 may be curved or provided horizontally.

An air nozzle 9 connected with a compressor 8 is provided at the initial end 3A of the transport pipe 3. The transport plug 4 can be pneumatically transported to the material discharge port 10 provided at the terminal end 3B of the transport pipe 3 by supplying compressed air into the transport pipe 3 from the air nozzle 9, shown as an arrow B with a broken line in FIG. 1. Compressed air may be actively supplied for moving the transport plug 4 forward or suction means may be operated in order to return the transport plug 4 into the plug setting portion 1c after it is pneumatically transported to the material discharge port 10. Otherwise, the system may be constructed such that the transport plug 4 descends in the inclined transport pipe 3 under gravity.

Figure 2:
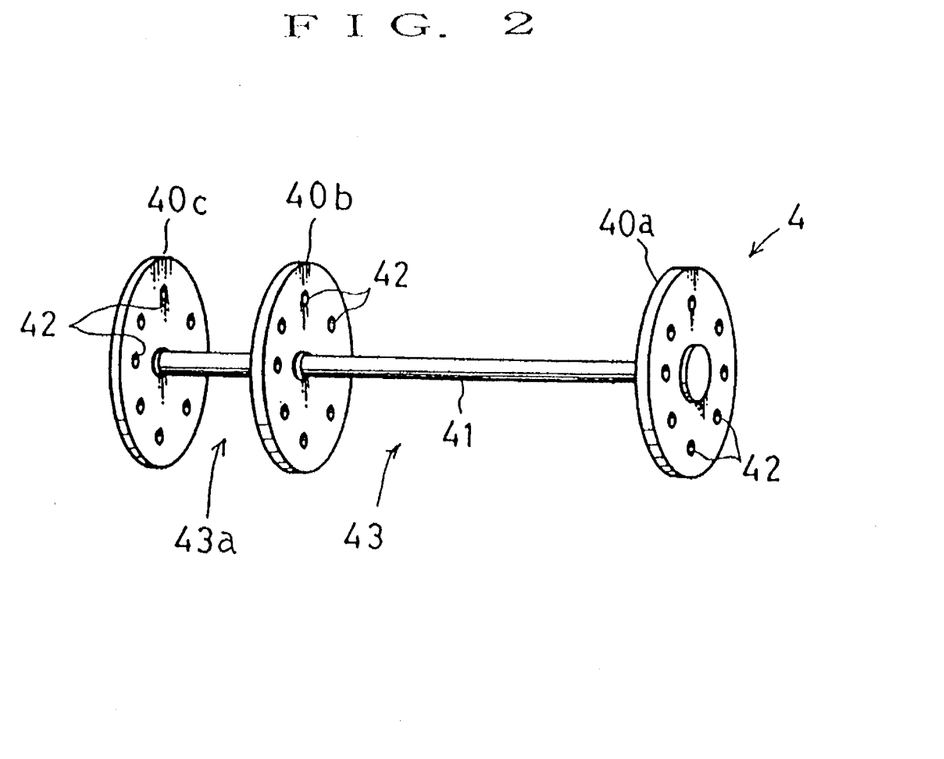
FIG. 2 is a perspective view of a transport plug used for a pneumatic transport system for powdered or granular materials according to the present invention.

One embodiment of the transport plug 4 is constructed such that three disc-like bodies 40a, 40b, 40c are connected with a connecting rod 41 to each other and spaces 43, 43a for storing powdered or granular materials are formed between each of the bodies 40a, 40b, 40c. Each of the bodies 40a, 40b, 40c are provided with through holes 42. According to such a construction, the air in the transport pipe 3 passes through each of the holes 42 and air resistance on the transport plug 4 is reduced when the transport plug 4 is returned downwardly under gravity from the material discharge port 10. Therefore, its returning speed can be increased.

Figure 3:
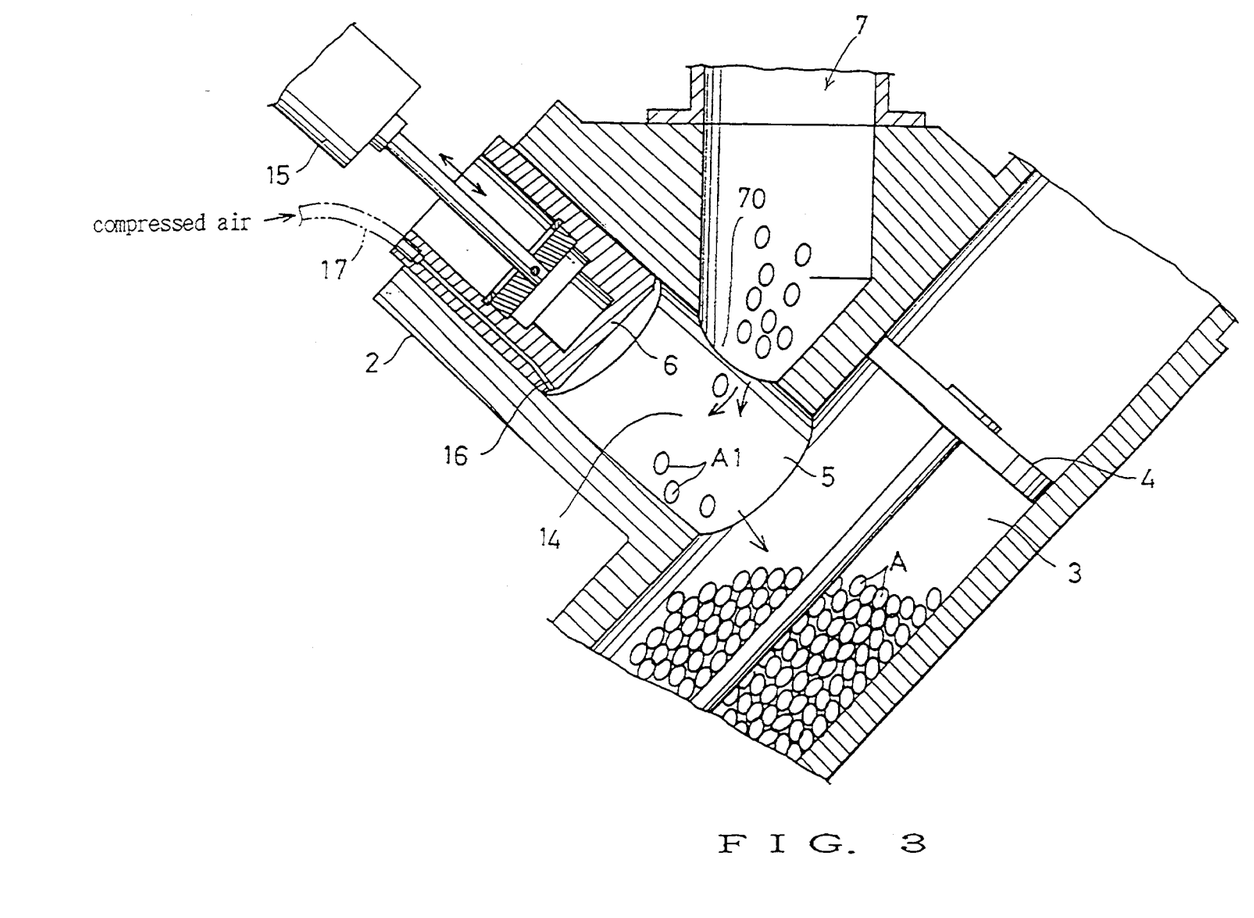
FIG. 3 is a sectional view showing how a valve plug is installed.

The valve plug 6, a piston type plug, is provided in a communication passage 14 of which one end is opened as the material supply port 5, as shown in FIG. 3. The valve plug 6 can be reciprocated by an air cylinder 15 and the material supply port 5 can be opened and closed by the tip of the valve plug 6. The material feeder 7 is provided above the communication passage 14 and its bottom opening 70 is communicated with the material supply port 5 of the transport pipe 3. The bottom opening 70 is opened at the same time that the material supply port 5 is opened by retracting the valve plug 6 as shown in FIG. 3 and communicated to the transport pipe 3 via the communication passage 14. On the other hand, the bottom opening 70 is closed by the circumferential side of the valve plug 6 when the valve plug 6 closes the material supply port 5 as shown in FIG. 1. An air discharge port 16 is provided at a lower side of the tip of the valve plug 6. The air discharge port 16 is provided for discharging compressed air forward of the valve plug 6. Compressed air is supplied from an air pipe 17 connected at the rear of the valve plug 6.

Figure 4:
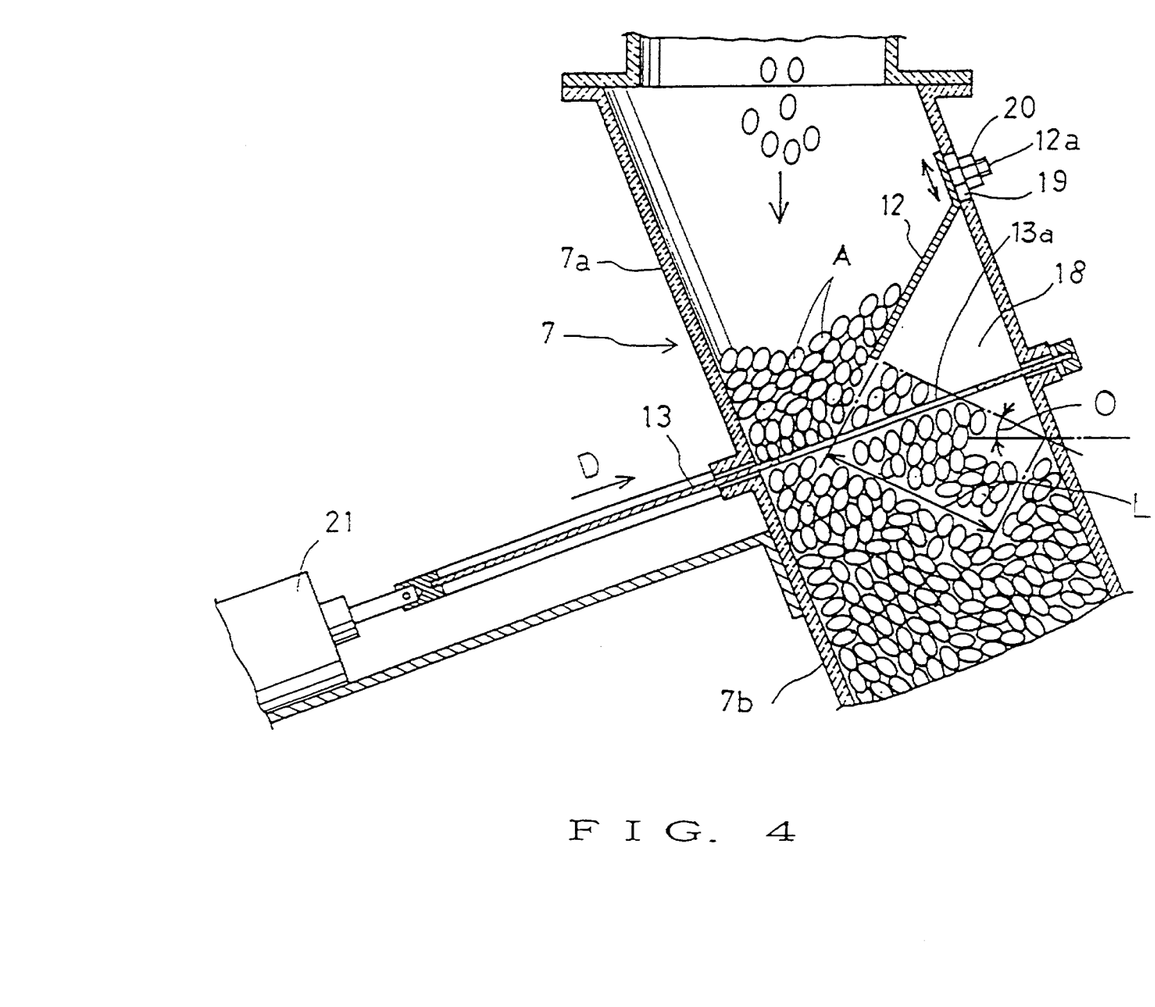
FIG. 4 is a section showing how an inclined guide plate and a slide damper are provided for a material feeder.

The material feeder 7 is comprised of pipe members 7a, 7b which form a passage through which tablets A are supplied from the pipe 50a of the tablet molding machine 50. The feeder 7 is designed so as to be inclined at an appropriate angle (for example about 30 degrees) so as to have enough capacity for an escaping space 18. The inclined guide plate 12, a flat plate with an opening 13a, is provided so as to be inclined downwardly from one side of the upper inner wall of the material feeder 7. The inclined guide plate 12 is provided for producing the escaping space 18 under which the tablets A aren't filled even if the tablets A are fed at the level exceeding the guide plate 12, as shown in FIG. 4. The inclined guide plate 12 is installed in such a manner that a support pin 12a projecting at the back of the guide plate 12 penetrates a long hole 19 of the pipe member 7a to be supported by a nut 20 enabling its mounting height to be adjusted up and down by loosening the nut 20. Otherwise, the inclined angle of the guide plate 12 is preferably adjusted at random (not shown).

The slide damper 13 is formed as a thin plate and is provided between the pipe members 7a and 7b. The slide damper 13 is moved perpendicularly to the material feed by driving an air cylinder 21 so as to interrupt material feeding. The slide damper 13 has an opening 13a and is provided below the inclined guide plate 12 and moves from the opposite side of where the inclined guide plate 12 is attached toward the escaping space as shown by the arrow D.

Next, how the above-mentioned pneumatic transport system is used and operated will be described.

The tablets A manufactured by the tablet molding machine 50 are sequentially fed into the material feeder 7 with the material supply port 5 and the bottom opening 70 of the material feeder 7 closed by the valve plug 6.

The slide damper 13 is operated to be moved in the material feeder 7 after the tablets A therein reach above the guide plate 12.

Whether the tablets A reach above the guide plate 12 or not can be decided by the operating time of the molding machine 50 taking its manufacturing capacity into consideration. Otherwise, a sensor (not shown) for detecting the tablets A may be provided above the inclined guide plate 12. In this case, any sensor will do, so long as it can detect whether the tablets A are filled over the guide plate 12 or not. Its handling is easy because it isn't provided for weighing the tablets A accurately.

When the tablets A are fed above the inclined guide plate 12, the escaping space 18 in which tablets A aren't filled is formed under the guide plate 12. It is because the tablets A which are pushed past the inclined guide plate 12 don't have fluid characteristics that they do not fill the space 18. The tablets A have characteristics that may be filled steadily at a fixed angle of repose 0. The angle of repose 0 has the property that forms the same angle according to the kind of tablets A. Therefore, the capacity of the space 18 formed under the guide plate 12 can be always the same, if kind of the tablets A is the same. Accordingly, the amount of the tablets A filled under the slide damper 13 can be constant when the slide damper 13 slides in the material feeder 7 so as to divide the tablets A up and down, the tablets A being quantified.

The amount of the tablets A can be increased or decreased by varying the capacity under the slide damper 13 in the material feeder 7.

Figure 5:
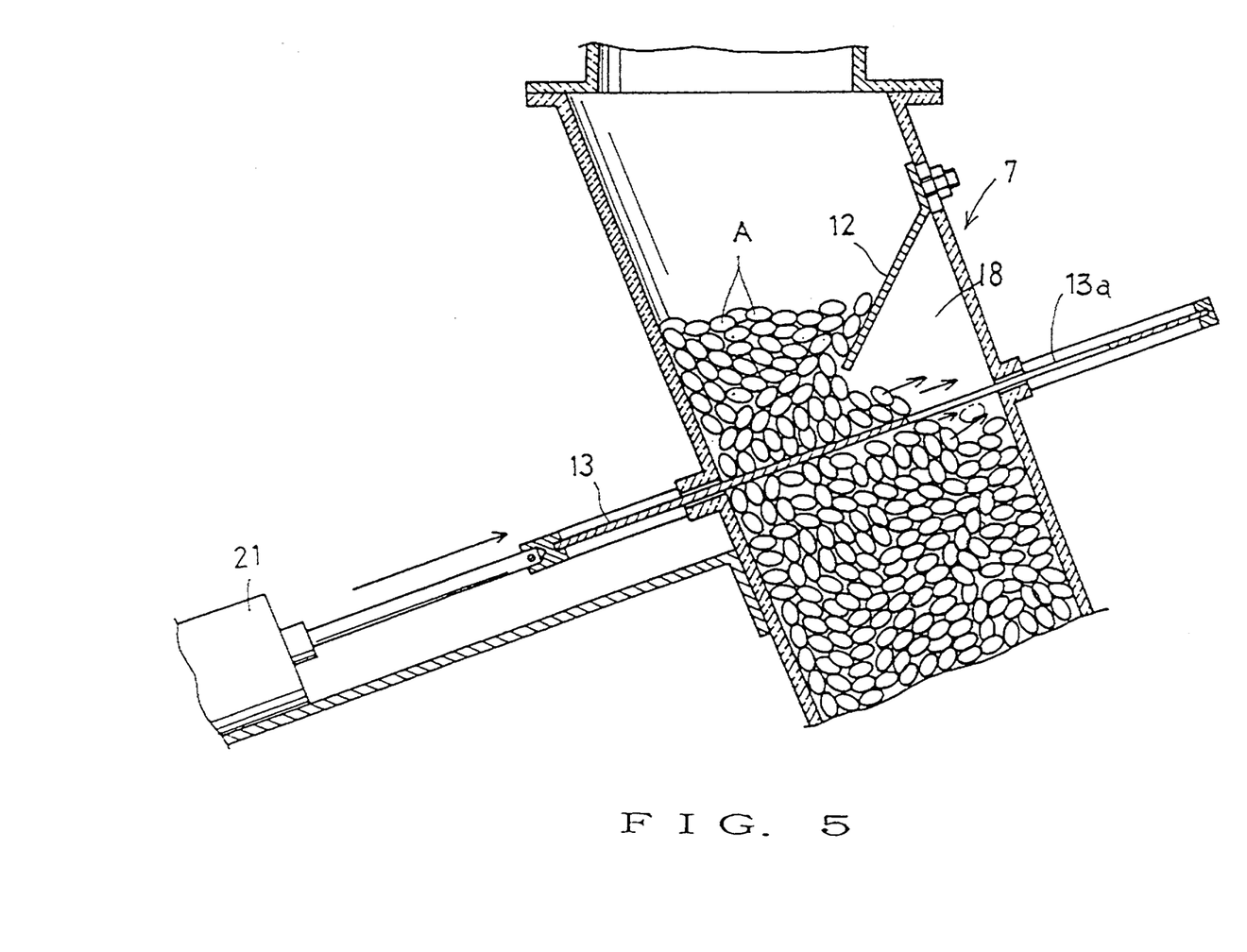
FIG. 5 is a sectional view of one embodiment showing how a slide damper divides an inside of a material feeder vertically.

On the other hand, when the slide damper 13 is going to be operated with the tablets A filled densely, the slide damper 13 can't be operated smoothly by the resistance of the tablets A and may cause the tablets A to be crushed. However, according to the present invention, the slide damper 13 slides toward the escaping space 18 in which the tablets A aren't filled. The tablets A which are pushed by the slide damper 13 are moved toward the escaping space 18 with a large degree of freedom and stored therein. The slide damper 13 doesn't have the difficulty in moving the tablets A because of the resistance of the tablets A. Furthermore, the tablets A can be prevented from being crushed or damaged by the slide damper 13.

Figure 6:
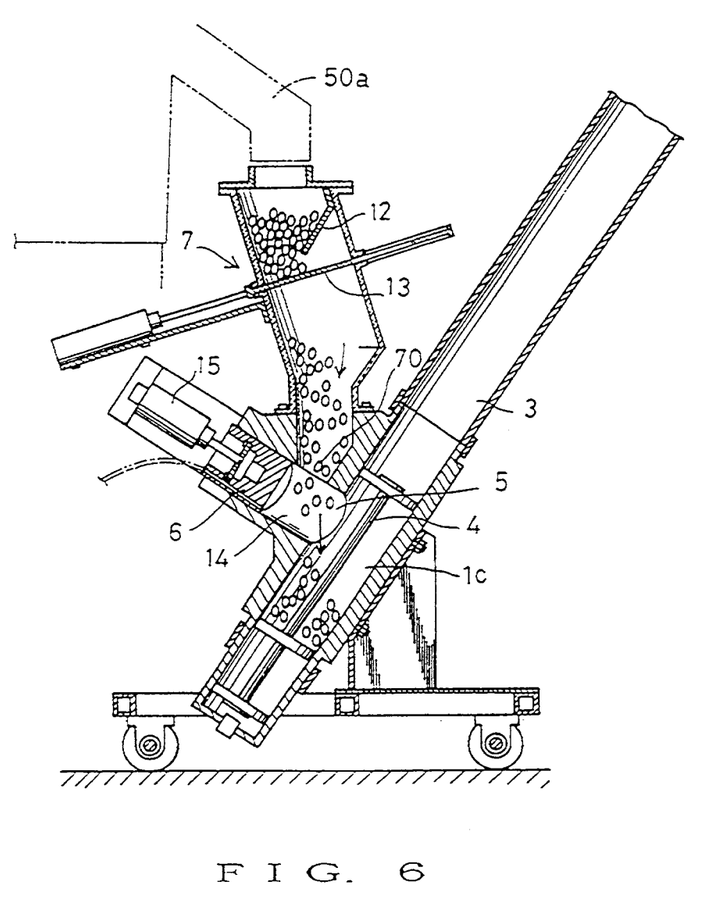
FIG. 6 is a sectional view of one embodiment showing how powdered or granular materials stored in a material feeder are fed into a transport plug.

After the slide damper 13 divides the material feeder 7 vertically as mentioned above, the valve plug 6 is retracted as shown in FIG. 6. Then the tablets A under the slide damper 13 are stored in the transport plug 4 housed in the transport pipe 3 through the communication passage 14. The tablets A manufactured in the tablet molding machine 50 can be successively fed into the upper part of the material feeder 7 above the slide damper 13 because the slide damper 13 closes the inside of the material feeder 7.

After the tablets A are stored in the transport plug 4, the material supply port 5 is closed by forwarding the valve plug 6. Then the transport plug 4 is pneumatically transported to the material discharge port 10 by means of compressed air supplied from the nozzle 9. The tablets A1 remaining in the communication passage 14 can be blown away into the transport pipe 3 through the material supply port 5 by ejecting compressed air from the air discharge port 16 when the valve plug 6 is forwarded, as shown in FIG. 3. Therefore, all of the quantified tablets A can be stored in the transport plug 4 without leaving the tablets in the passage 14. Further, the tablets A1 remaining in the communication passage 14 aren't pinched by the valve plug 6. The material supply port 5 is closed airtightly when the valve plug 6 is forwarded as shown in FIG. 1, preventing compressed air in the transport pipe 3 from leaking out of the supply port 5. Accordingly, the transport plug 4 can execute pneumatic transportation properly. In this case, the bottom opening 70 of the material feeder 7 is closed at the same time and the tablets A can be filled in the material feeder 7 by retracting the slide damper 13 to its original position while the transport plug 4 pneumatically transports the tablets. Consequently, the quantification of the materials A to be transported next can be executed efficiently and the efficiency of the transportation can be improved.

The above-mentioned pneumatic transportation system is constructed with a main object of quantitative transportation of the tablets A. However, the pneumatic transportation system can be utilized for pneumatically transporting tablets of unfixed weight. In such a case, open and close operations of the slide damper 13 aren't necessary. Each time the transport plug 4 is returned to the material supply port 5 after pneumatic transportation of the tablets A is finished, a moderate amount of the tablets A stored in the material feeder 7 are fed into the transport plug 4 to be stored.

Figure 7:
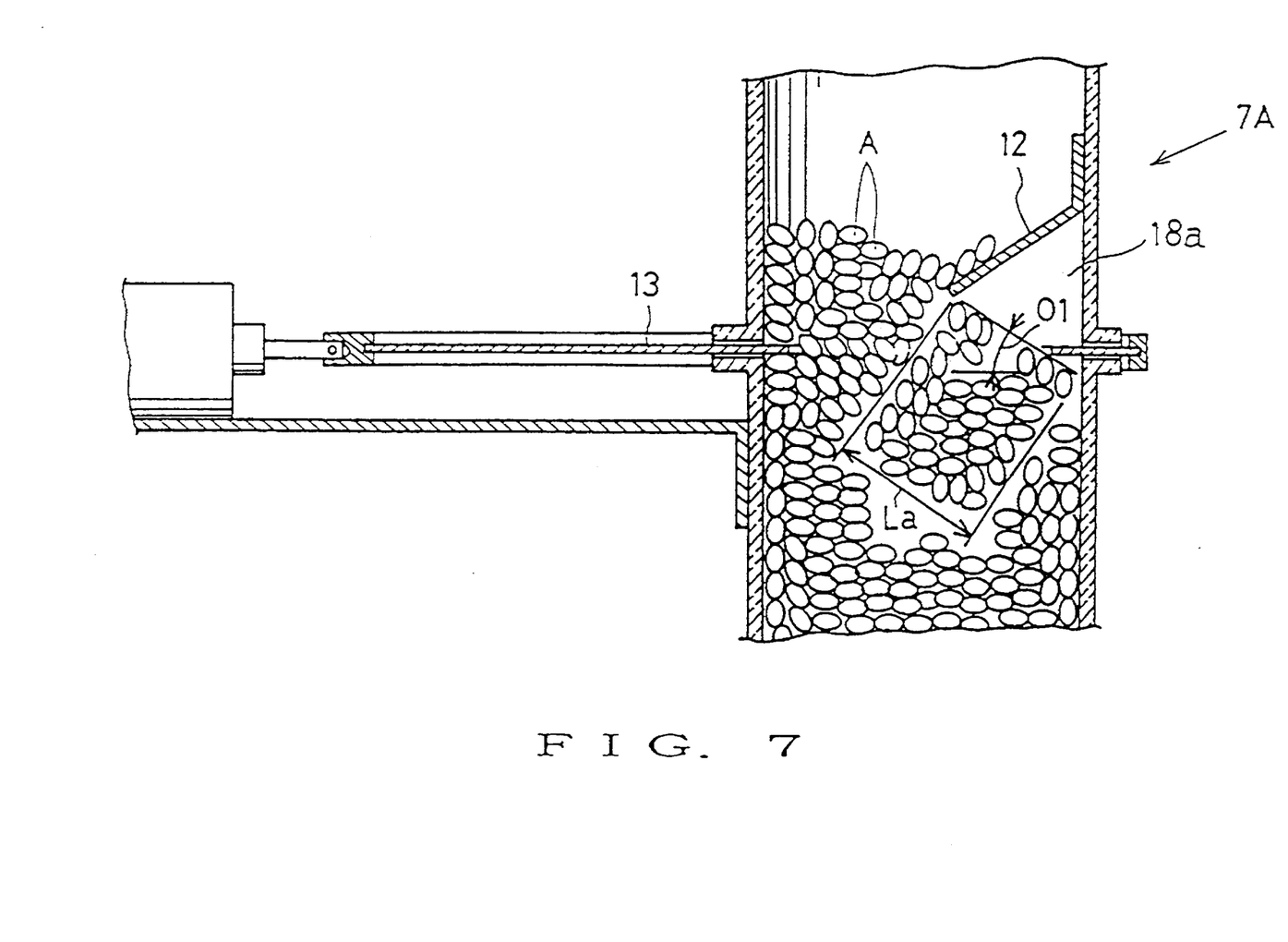
FIG. 7 is a partial sectional view of another embodiment of the material feeder.

In the above-mentioned embodiment, the material feeder 7 is constructed so as to be inclined at a fixed direction. However, other embodiments aren't restricted to this construction. For example, the pipe member 7a may be provided vertically as shown in FIG. 7. In such a construction, the escaping space 18a in which the tablets A aren't filled can be formed under the inclined guide plate 12 at a fixed angle of repose 01. However, if the material feeder 7 is inclined as shown in FIG. 4, the length L can be longer than the length La in FIG. 7 and the capacity of the space 18 can be enlarged. Therefore, it is preferable to incline the material feeder 7.

Further, it is preferable that the slide damper 13 slides into the escaping space 18 under the guide plate 12 and divides the tablets A vertically in order to prevent the tablets A from being damaged without exception. However, the other embodiment as described hereinbefore isn't restricted to such a construction. When materials are not tablets which are apt to be damaged but powdered or granular materials which are comparatively hard and aren't easily damaged, it may be constructed that the slide damper 13 is attached to move a little lower than where the escaping space 18 is formed. In such a case, the materials filled in the material feeder 7 have fluid characteristics owing to the escaping space 18. Therefore, such a problem that the slide damper 13 can't divide the materials A in the material feeder 7 vertically can be solved.

Figure 9:
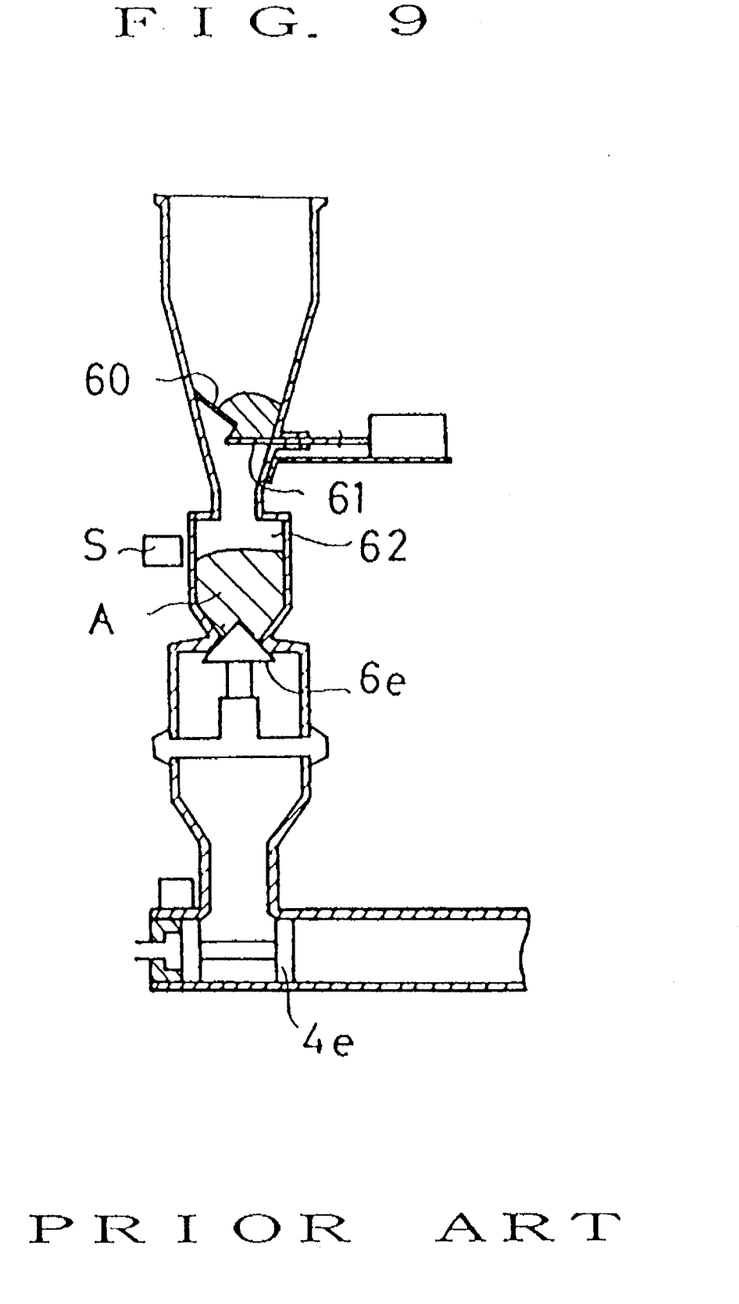
FIG. 9 is a sectional view showing how the pneumatic transport system of FIG. 8 is operated.

Furthermore, the construction and shape of the transport pipe 3 and transport plug 4 aren't restricted to the above-mentioned embodiments. Also, the construction of the valve plug 6 isn't restricted to the above-mentioned embodiment. The valve plug 6e as shown in FIG. 8 and FIG. 9 as prior art can be employed.

Powdered or granular materials to be transported aren't restricted to tablets. Various solid materials such as confectioneries, candies, semiconductor chips and mechanical parts can be transported according to the present invention.

It will be apparent that the present invention, as described above, solves the problem that the slide damper 13 doesn't operate because of the powdered or granular materials densely filled in the material feeder 7. Further, quantification of powdered or granular materials can be executed by dividing operation of the slide damper 13 without a sensor. It is because that powdered or granular materials in the material feeder 7 can be divided vertically with the space 18 formed in the feeder 7. As the result, a mistake in quantifying materials caused by inadequate adjustment of a sensor or attachment of powders on a light receiving surface of a sensor, which has been apt to be caused in the prior art, doesn't happen. Therefore, quantitative transportation of powdered or granular materials can be executed properly.

According to the present invention, powdered or granular materials pushed by the slide damper 13 are directly forwarded into the escaping space 18 when the slide damper 13 is moved into the material feeder 7. Therefore, damages of powdered or granular materials can be appropriately prevented because crush of materials by the slide damper 13 is eliminated. It is apparent that the present invention is most suitable for pneumatically transporting tables or solid materials which are highly required not to be damaged and to keep high quality.

Further according to the present invention, damage of materials can be prevented more effectively when the escaping space 18 is enlarged by inclining the material feeder 7.

In the present invention, it is apparent that compressed air in the transport pipe 3 used for pneumatic transportation doesn't leak into the bottom opening 70 of the material feeder 7 because the material supply port 5 and the bottom opening 70 of the material feeder 7 can be opened or closed at the same time by means of the same valve plug 6. The material feeder 7 can be constructed lower because the valve plug 6 isn't required to be installed in the material feeder 7.

It is also apparent that the materials remaining in the material communication passage 14 are accurately prevented from being damaged by being pinched with the valve plug 6. This is so because the remaining materials can be blown away into the transport pipe 5 through the material supply port 5 even if materials discharged from the bottom opening 70 of the feeder 7 remain in the communication passage 14.

Further, the construction of the system can be simplified because the transport plug 4 is returned to the material supply port 5, its original position, under gravity after the transport plug 4 finishes the transportation of materials at the material discharge port 10. The transportation of materials can be executed efficiently because the air resistance on the transport plug 4 can be reduced owing to ventilating operation of the many through holes 42 of the bodies 40a, 40b, 40c of the transport plug 4. Therefore the time which it takes to return to the material supply port 5 can be shortened.

What is claimed is:

1. A pneumatic transport system for transferring powdered or granular material by a transport plug in a transport pipe from a plug setting portion to a discharge port in the transport pipe, the transport pipe having a material feeder connected to a material supply port formed integrally with the transport pipe, the material feeder being inclined so that the material supply port is positioned lower than the discharge port, the material feeder comprising:

a valve for opening and closing a bottom opening of said material feeder, said bottom opening communicating with said material supply port of said transport pipe;

an inclined guide plate for producing an escaping space thereunder in which no material is filled when materials are charged into said material feeder under the condition that said bottom opening is closed by said valve; and a slide damper disposed under said inclined guide plate, for dividing the material charged into said material feeder up and down so that some of the material enters said escaping space when the material is charged into said material feeder over the level of said guide plate.

2. A pneumatic transport system for powdered or granular material as set forth in claim 1, wherein said slide damper moves close to said escaping space formed under said guide plate from the opposite side of said guide plate so as to divide the material charged into said material feeder up and down with some of the material entering said escaping space.

3. A pneumatic transport system for powdered or granular material as set forth in claim 2, wherein a body of said material feeder is inclined at a specific angle so that the capacity of said escaping space formed under said inclined plate is enlarged.

4. A pneumatic transport system for powdered or granular material as set forth in claim 3, wherein said valve is reciprocatably provided in a communication passage of which one end is communicated with said material supply port of said transport pipe and the other end is communicated with said bottom opening of said material feeder, and wherein said bottom opening is closed when said valve moves forward to close said supply port of said transport pipe.

5. A pneumatic transport system for powdered or granular material as set forth in claim 3, wherein said transport plug has disc-like bodies having plural through holes for passing air therethrough so as to reduce air resistance when said transport plug falls under gravity into said plug setting portion of said transport pipe after said transport plug is pneumatically moved up to said material discharge port transferring granular material, and wherein said transport pipe further comprises gas supply means for pneumatically moving up said transport plug set in said plug setting portion of said transport pipe to said material discharge port of said transport pipe.

6. A pneumatic transport system for powdered or granular material as set forth in claim 2, wherein said valve is reciprocatably provided in a communication passage of which one end is communicated with said material supply port of said transport pipe and the other end is communicated with said bottom opening of said material feeder, and wherein said bottom opening is closed when said valve moves forward to close said supply port of said transport pipe.

7. A pneumatic transport system for powdered or granular material as set forth in claim 2, wherein said transport plug has disc-like bodies having plural through holes for passing air therethrough so as to reduce air resistance when said transport plug falls under gravity into said plug setting portion of said transport pipe after said transport plug is pneumatically moved up to said material discharge port transferring granular material, and wherein said transport pipe further comprises gas supply means for pneumatically moving up said transport plug set in said plug setting portion of said transport pipe to said material discharge port of said transport pipe.

8. A pneumatic transport system for powdered or granular material as set forth in claim 1, wherein said valve is reciprocatably provided in a communication passage of which one end is communicated with said material supply port of said transport pipe and the other end is communicated with said bottom opening or said material feeder, and wherein said bottom opening is closed when said valve moves forward to close said supply port of said transport pipe.

9. A pneumatic transport system for powdered or granular material as set forth in claim 8, wherein said valve further comprises air discharge means for blowing away materials remaining in said communication passage into said transport pipe through said material supply port of said transport pipe.

10. A pneumatic transport system for powdered or granular material as set forth in claim 9, wherein said transport plug has disc-like bodies having plural through holes for passing air therethrough so as to reduce air resistance when said transport plug falls under gravity into said plug setting portion of said transport pipe after said transport plug is pneumatically moved up to said material discharge port transferring granular material, and wherein said transport pipe further comprises gas supply means for pneumatically moving up said transport plug set in said plug setting portion of said transport pipe to said material discharge port of said transport pipe.

11. A pneumatic transport system for powdered or granular material as set forth in claim 8, wherein said transport plug has disc-like bodies having plural through holes for passing air therethrough so as to reduce air resistance when said transport plug falls under gravity into said plug setting portion of said transport pipe after said transport plug is pneumatically moved up to said material discharge port transferring granular material, and wherein said transport pipe further comprises gas supply means for pneumatically moving up said transport plug set in said plug setting portion of said transport pipe to said material discharge port of said transport pipe.

12. A pneumatic transport system for powdered or granular material as set forth in claim 1, wherein said transport plug has disc-like bodies having plural through holes for passing air therethrough so as to reduce air resistance when said transport plug falls under gravity into said plug setting portion of said transport pipe after said transport plug is pneumatically moved up to said material discharge port transferring granular material, and wherein said transport pipe further comprises gas supply means for pneumatically moving up said transport plug set in said plug setting portion of said transport pipe to said material discharge port of said transport pipe.

* * * * *